(12) United States Patent
Buccella et al.

(10) Patent No.: US 7,836,348 B2
(45) Date of Patent: Nov. 16, 2010

(54) METHOD AND SYSTEM FOR CALCULATING AND DISPLAYING RISK

(75) Inventors: Christopher J. Buccella, Poughkeepsie, NY (US); Sean L. Dague, Poughkeepsie, NY (US); Daniel McCune Smith, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 11/776,846

(22) Filed: Jul. 12, 2007

(65) Prior Publication Data

US 2009/0019316 A1    Jan. 15, 2009

(51) Int. Cl.
*G06F 11/00* (2006.01)
(52) U.S. Cl. .......................................... 714/39; 714/47
(58) Field of Classification Search ................... 714/47, 714/37, 39, 46; 706/47; 705/38; 709/206; 455/433
See application file for complete search history.

(56) References Cited

U.S. PATENT DOCUMENTS

| | | | | |
|---|---|---|---|---|
| 6,167,265 A * | 12/2000 | Kim et al. | ................... | 455/433 |
| 6,219,805 B1 | 4/2001 | Jones et al. | | |
| 6,983,221 B2 * | 1/2006 | Tracy et al. | ................. | 702/181 |
| 7,006,992 B1 * | 2/2006 | Packwood | .................... | 705/38 |
| 2002/0194040 A1 | 12/2002 | Kornfein et al. | | |
| 2003/0115511 A1 * | 6/2003 | Kubota | ......................... | 714/47 |
| 2004/0078732 A1 * | 4/2004 | Meaney | ........................ | 714/57 |
| 2004/0230548 A1 * | 11/2004 | Wookey | ...................... | 706/47 |
| 2004/0230597 A1 | 11/2004 | Wookey | | |
| 2006/0015560 A1 * | 1/2006 | MacAuley et al. | .......... | 709/206 |
| 2006/0143575 A1 * | 6/2006 | Sauermann | ............... | 715/808 |
| 2007/0067848 A1 * | 3/2007 | Gustave et al. | ................ | 726/25 |

OTHER PUBLICATIONS

"Shunra Virtual Enterprise 5.0 Overview", Shunra Software Ltd., 2006, pp. 1 http://www.shunra.com/content.aspx?pageId=69.
"Shunra Virtual Enterprise 5.0 Technology", Shunra Software Ltd., 2006, pp. 1-2 http://www.shunra.com/content.aspx?pageId=12.
Chang et al., "An Integrated Alarm Monitoring System for Customer-Controlled DS-1 Service," NOMS '90 IEEE 1990 Network Operations and Management Symposium 'Operations for the Information Age', p. 13.3/1-12, Feb. 11-14, 1990.

* cited by examiner

*Primary Examiner*—Scott T Baderman
*Assistant Examiner*—Sarai Butler
(74) *Attorney, Agent, or Firm*—Yee & Associates, P.C.; Steven L. Bennett

(57) ABSTRACT

A system for calculating and rendering a risk level. In response to receiving an input to perform an action within a data processing system, a level of risk to the data processing system to perform the action is calculated based on a set of rules. It is determined whether the calculated level of risk presents an elevated risk. In response to determining that the calculated level of risk does present the elevated risk, a user interface is rendered with an appropriate elevated visual warning based on the calculated level of risk.

19 Claims, 3 Drawing Sheets

METHOD AND SYSTEM FOR CALCULATING AND DISPLAYING RISK

BACKGROUND OF THE INVENTION

1. Field of the Invention

The present invention relates generally to an improved data processing system. More specifically, the present invention is directed to a computer implemented method, system, and computer usable program code for calculating and displaying a risk level of performing an operation within the data processing system.

2. Description of the Related Art

Today, data processing systems are rapidly growing in complexity and are playing important roles in most businesses and industries. As a result, these businesses and industries are demanding higher quality data processing systems, which, for example, have zero service downtime. For example, in the telecommunications industry, network outages, or even brief interruptions of service, has a significant effect on the network's users. In the financial industry, a bank may lose millions of dollars during a brief service outage. On a more global scale, failure of densely interconnected networks that are essential to governmental operations may pose a huge security risk. Thus, keeping these data processing systems up and running is crucial.

A traditional approach to computing resiliency is from a standpoint of software or hardware failures. A common assumption is that the number one cause for system outages is a software or hardware failure. Consequently, businesses and industries work very hard to ensure that software and hardware are robust. However, a large number of system outages are created by system administrator error. For example, the system administrator may assume that a particular action, or operation, will not have a negative effect on the data processing system, when in fact that particular action will have a profound negative impact on the data processing system.

If system administrators were presented with a realistic risk assessment for data processing system operations in an easy to distinguish visual manner, less human error would result and, therefore, fewer system outages. This type of risk assessment approach is radically different from currently used approaches in the field, which only present binary decisions to the system administrator without much other information on the real risks that may be created by performing a particular operation. Hence, applications that make system administrators less prone to human error will be an extreme change from the present information technology (IT) landscape.

Therefore, it would be beneficial to have an improved computer implemented method, system, and computer usable program code for calculating a level of risk for a user to perform a particular action within a data processing system and displaying that calculated risk level to the user in an easy to distinguish visual manner.

SUMMARY OF THE INVENTION

Illustrative embodiments provide a computer implemented method, system, and computer usable program code for calculating and rendering a risk level. In response to receiving an input to perform an action within a data processing system, a level of risk to the data processing system to perform the action is calculated based on a set of rules. It is determined whether the calculated level of risk presents an elevated risk. In response to determining that the calculated level of risk does present the elevated risk, a user interface is rendered with an appropriate elevated visual warning based on the calculated level of risk.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
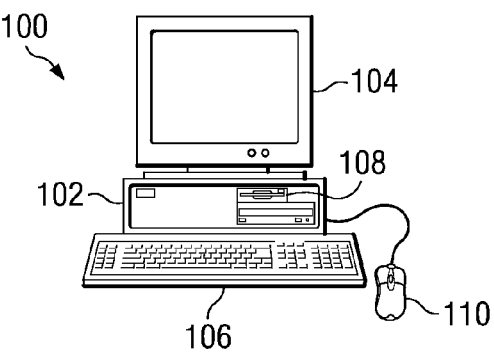
FIG. 1 is a pictorial representation of a data processing system in which illustrative embodiments may be implemented.
Figure 2:
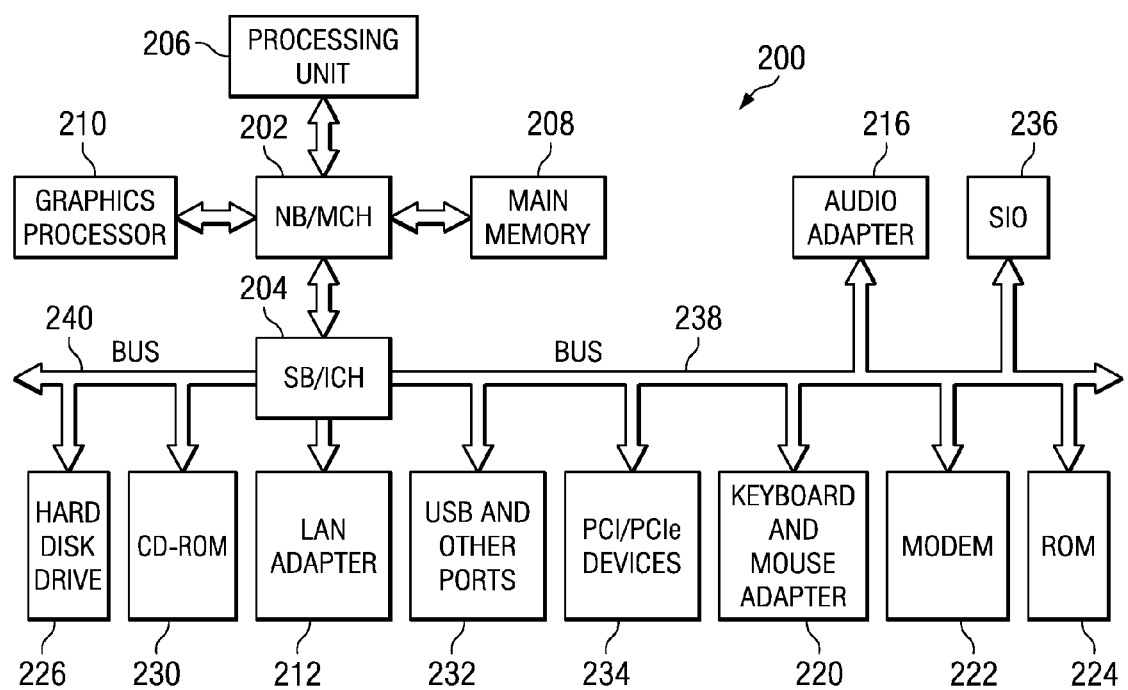
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a data processing system in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices may include, for example, a joystick, a touchpad, a touch screen, a trackball, and a microphone.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to NB/MCH 202. Processing unit 206 may contain one or more processors and even may be implemented using one or more heterogeneous processor systems. Graphics processor 210 may be coupled to NB/MCH 202 through an accelerated graphics port (AGP), for example.

In the depicted example, local area network (LAN) adapter 212 is coupled to SB/ICH 204, audio adapter 216, keyboard and mouse adapter 220, modem 222, read only memory (ROM) 224, universal serial bus (USB) and other ports 232. PCI/PCIe devices 234 are also coupled to SB/ICH 204 through bus 238. Hard disk drive (HDD) 226 and CD-ROM 230 are coupled to SB/ICH 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to SB/ICH 204.

An OS runs on processing unit 206. This OS coordinates and controls various components within data processing system 200 in FIG. 2. The OS may be a commercially available OS, such as Microsoft® Windows XP®. Microsoft® and Windows XP® are trademarks of Microsoft Corporation in the United States, other countries, or both. Alternatively, the OS may, for example, be an advanced interactive executive (AIX®) OS, which is a product available from the IBM® Corporation. An object oriented programming system, such as the Java™ programming system, may run in conjunction with the OS and provides calls to the OS from Java™ programs or applications executing on data processing system 200. Java™ and all Java™-based trademarks are trademarks of Sun Microsystems, Inc. in the United States, other countries, or both.

Instructions for the OS, the object-oriented programming system, and applications are located on storage devices, such as HDD 226. These instructions and may be loaded into main memory 208 for execution by processing unit 206. The processes of the illustrative embodiments may be performed by processing unit 206 using computer implemented instructions, which may be located in a memory. An example of a memory is main memory 208, ROM 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 may be varied from the illustrative examples shown. In some illustrative examples, data processing system 200 may be a personal digital assistant (PDA). A personal digital assistant generally is configured with flash memory to provide a non-volatile memory for storing OS files and/or user-generated data. Additionally, data processing system 200 may be a tablet computer, laptop computer, or telephone device.

Other components shown in FIG. 2 may be varied from the illustrative examples shown. For example, a bus system may be comprised of one or more buses, such as a system bus, an I/O bus, and a PCI bus. Of course, the bus system may be implemented using any suitable type of communications fabric or architecture that provides for a transfer of data between different components or devices attached to the fabric or architecture. Additionally, a communications unit may include one or more devices used to transmit and receive data, such as modem 222 or LAN network adapter 212. Further, a memory may be, for example, main memory 208 or a cache such as found in NB/MCH 202. Also, a processing unit may include one or more processors or CPUs. Moreover, illustrative embodiments may be implemented in a logically partitioned data processing system.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

Illustrative embodiments provide a computer implemented method, system, and computer usable program code for calculating a risk level of performing an operation within a data processing system and displaying that calculated risk level to a user in a visually distinguishable manner. In response to receiving an input to perform an action within a data processing system, a systems management application calculates a level of risk to the data processing system to perform that action based on a set of composition rules. Then, the systems management application determines whether the calculated level of risk presents an elevated risk to the data processing system.

In response to determining that the calculated level of risk does present an elevated risk, the systems management application renders a user interface with an appropriate elevated visual warning based on the calculated level of risk. However, in response to determining that the calculated level of risk does not present an elevated risk, the systems management application renders the user interface without an elevated visual warning. A visual warning may, for example, include one of a plurality of specific colors or emoticons each associated with a specific level of risk.

Thus, illustrative embodiments may eliminate computing operations as being presented to a user as only a binary success/fail type risk assessment. Illustrative embodiments treat computing operations as more probabilistic in nature and present that probability to the user in an easy to understand visual manner.

Figure 3:
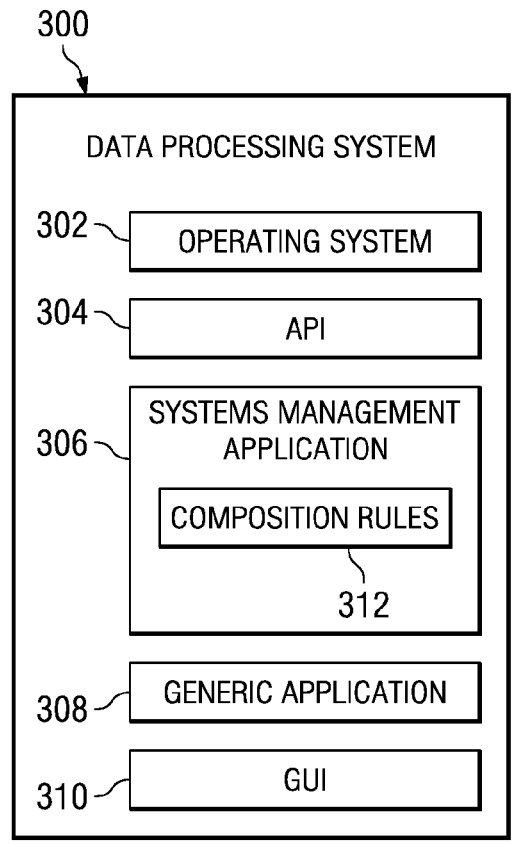
FIG. 3 is a block diagram illustrating components of a data processing system in accordance with an illustrative embodiment.

With reference now to FIG. 3, a block diagram illustrating components of a data processing system is depicted in accordance with an illustrative embodiment. Data processing system 300 may, for example, be implemented in data processing system 200 in FIG. 2. However, it should be noted that the example depicted in FIG. 3 is only intended for the purpose of illustration and does not imply any architectural limitations on illustrative embodiments. In other words, illustrative embodiments may include more or fewer components and may include any components necessary to accomplish the task of calculating and displaying a level of risk of performing an action within data processing system 300.

In the depicted example of FIG. 3, data processing system 300 includes OS 302, application programming interface (API) 304, systems management application 306, generic application 308, and GUI 310. OS 302 runs on a processor, such as, for example, processing unit 206 in FIG. 2, and provides high-level control of the components within data processing system 300. API 304 allows a user of data processing system 300, which may be an individual or a software routine, to invoke system capabilities using a standard consistent interface without concern for how the particular functionality is implemented.

Systems management application 306 is a software application that monitors and manages one or more systems within data processing system 300. Systems management application 306 may, for example, manage system operations, such as application distribution and upgrading, user profile management, version control, backup and recovery, printer spooling, job scheduling, virus protection, and performance and capacity planning. Also, systems management application 306 may, for example, monitor, calculate, and display risk assessment of operations performed by a user within data processing system 300. A user may be an individual or an application. In addition, systems management application 306 may assess a level of risk of operations in response to a manual input by an individual or an automatic input by an application.

With regard to risk assessment of operations, systems management application 306 utilizes composition rules 312 to assess the level of risk for performing a particular action, or operation, within data processing system 300. Composition rules 312 are a set of rules that create a composite of the aggregate risk produced by performing an action.

Generic application 308 may, for example, be a virtual machine application or a database application within data processing system 300. However, it should be noted that generic application 308 may represent any type of software application or program. In addition, application 308 may represent a plurality of applications and/or programs.

A user of data processing system 300 utilizes GUI 310 to interact with programs and applications residing within data processing system 300, such as, for example, OS 302, systems management application 306, and generic application 308. GUI 310 is a graphics-based user interface that incorporates movable windows and icons, which may be displayed in a display screen and manipulated by user input devices. For example, GUI 310 may be displayed in video display terminal 104 and manipulated by keyboard 106 and mouse 110 in FIG. 1. Typically, GUI 310 is the standard way a user interacts with a computer, such as data processing system 300.

Systems management application 306 creates a five color risk assessment scale for operations performed within data processing system 300. Systems management application 306 utilizes composition rules 312 to assess the risk of higher order operations derived from lower level hardware components. This risk assessment may be within a single application or across a plurality of applications within data processing system 300. Also, systems management application 306 visually displays this risk assessment to the user, such as a system administrator, through a GUI in a variety of easily distinguishable colors or emoticons.

As an exemplary illustration, assume a database administrator is performing routine maintenance operations on a database using an interactive standard query language (SQL) console. Possible risks associated with various operations performed by the database administrator may be as follows:

1) select * from some table—the risk level is low because this type of operation does not modify any data within a database, but only displays rows and columns of the table to the user.

2) select * from table, table, table, etc.—the risk level is low, but higher than the operation performed in number one above because such a huge join operation may take critical resources away from other tasks.

3) update table1 set foo=bar where foo=baz—the risk level is medium because an operation that alters data within the database always has inherent risk, but the risk is reasonably constrained with this type of operation. The risk is reasonably constrained because only a one-to-one operation is being performed on the table and, thus, the database administrator is likely to want this operation to occur.

4) update table1 set foo=bar—the risk level is high because the system administrator probably does not want to perform a blanket update operation of every row in an entire column of the table. Even if the system administrator wants to perform this blanket update operation, the risk of negatively affecting the system is high.

5) delete from table1—the risk level is high because this type of operation will completely erase the entire table.

6) delete from table1 where foo=baz—the risk level is medium because this type of operation is more constrained than the example of number five above. This operation is more constrained because the database administrator is only deleting rows from the table instead of deleting the entire table. However, performing this type of operation may still have unintended results on the system.

It should be noted that a database administration tool, which is built-in to the database and is provided by the application vendor, may provide the risks involved with these particular actions. Alternatively, a risk broker system or some other type of remote expert system may provide a risk matrix for operations performed by one or more applications to data processing system 300. A risk broker system is a system that receives operation risk levels from, for example, the vendors and/or the applications, themselves, and distributes these operation risk levels to registered data processing systems. Also, it should be noted that the risk broker system or expert system may be located locally.

While any of the six operations performed above may be correct and appropriate, the risks associated with these operations are not uniform. Any expert schooled in the art of database operation will intrinsically know the risks involved with normal operations. However, in the "real world" not every user maintaining a database system may be considered an expert.

Therefore, illustrative embodiments create a model for presenting the risks associated with data processing system operations to the user in an easy to understand way. By presenting the risks to the user in an easy to understand way, the user is less likely to accidentally make a fatal error when administering the system. Traditionally, presentations of warnings to the user are based on the final presentation layer of the application. For instance, a Windows Security Patch may display a warning that an operation may damage the system, back up everything, shut down all applications, etc. Typically, the user ignores this type of generic warning because the warning is a boilerplate and is presented to the user in the same manner whether the warning is on, for example, a desktop personal computer or a mainframe database system.

Systems management application 306 utilizes the five color risk assessment scale to communicate a level of risk to data processing system 300. The five colors of risk assessment include green, yellow, orange, red, and black. Each color indicates a specific level of risk of performing an action within data processing system 300. A level green risk poses a no to low risk to data processing system 300 to perform the action. In other words, the probability of success of performing that action is very high.

A level yellow risk poses a slight risk to data processing system 300 to perform the action. In other words, the probability of success of performing that particular action is high, but less than with a level green risk assessment. A level orange risk poses a significant risk to data processing system 300 to perform the action. In other words, the probability of success of performing that particular action is moderate.

A level red risk poses a major risk to data processing system 300 to perform the action. In other words, the probability of success of performing that particular action is low. A level black risk poses a catastrophic risk to data processing system 300 to perform the action. In other words, the probability of success of performing that particular action is very low to none.

Illustrative embodiments use a variety of distinguishable colors because a user may readily visualize these colors. However, it should be noted that illustrative embodiments are not limited to only using the five color scale described above. Illustrative embodiments may use fewer colors or more colors, such as, for example, blue, brown, and purple. In addition, illustrative embodiments may use combinations of colors or color patterns, such as, for example, plaids, stripes, and polka dots. Moreover, it should be noted that illustrative embodiments may also use other types of visual effects, such as, for example, emoticons or other icons, in addition to or instead of colors to represent a particular level of risk.

A basic rule of risk included in composition rules 312 is that an overall risk of a particular action equals a highest level of all associated risks in data processing system 300. For example, if the risk level factors for performing a particular operation are green, green, green, and orange for four components trying to perform that operation within data processing system 300, systems management application 306 calculates the overall, or total, risk at level orange. However, this basic composition rule may be made to show escalating risk by escalating the calculated level of risk to a next higher risk level after receiving three or more of a same risk level for different components trying to perform the operation within data processing system 300. For example, composition rules 312 may escalate a risk assessment to level red after receiving three or more level orange warnings for different components trying to perform a particular operation within data processing system 300.

Illustrative embodiments intentionally keep risk assessment non-numeric, as risk calculations are a rough heuristic and are not meant to be overly precise. Also, the non-numeric risk assessment is easily understood by an average user or administrator.

As another illustrative example of showing risk assessment by illustrative embodiments, a live relocation of a virtual machine application, such as, for example, Xen, is described. Illustrative embodiments perform pre-checks for performing the live relocation operation based on the green/yellow/orange/red/black risk assessment model. First, illustrative embodiments may assess machine architectures for risk. For example, assuming both architectures involved in the live relocation operation are the same, an i386 machine may have a level green risk, an x86_64 machine may have a level yellow risk, and an i386 PAE machine may also have a level yellow risk, whereas two entirely different machine architectures may have a level black risk.

Second, illustrative embodiments may assess the central processing units (CPUs) for risk. For example, assuming both CPUs involved in the live relocation operation are manufactured by the same vendor, a CPU with the same revision number may have a level green risk associated with it, a CPU with a lesser revision number may have a level yellow risk, and all other CPUs may have a level red risk. As media instructions change in each CPU version, there is a risk of a user space crashing if the user space has runtime optimized for those media instructions. Staying on the same type CPU is the only guarantee that a user space crash will not occur.

Third, illustrative embodiments may assess memories involved in the live relocation operation for risk. For example, a guest memory that is less than or equal to free memory may have a level green risk, a guest memory plus one gigabyte (GB) and Dom0 min below one GB that is less than or equal to Dom0 memory may have a level yellow risk, and all other memory may have a level red risk.

Fourth, illustrative embodiments may assess the networks involved in the live relocation operation for risk. For example, if a network bridge is used in the live relocation operation, then the risk may be level green, whereas all other network switching devices may be a level black risk. Fifth, illustrative embodiments may assess the hard disks involved in the live relocation operation. For example, relocating the virtual machine application to a network file system (NFS) root may be a level green risk, to an iSCSI may be a level yellow risk, and to all other disk types may be a level black risk.

Finally, illustrative embodiments may assess the internet protocol (IP) addresses involved in the live relocation operation. For example, an IP address in the same subnet may have a level green risk, whereas all other IP addresses may have a level orange risk associated with them. By aggregating all these risk factors described above, illustrative embodiments may calculate a composite level of risk associated with the live relocation of a guest application from one machine to another.

Furthermore, risk may become more interesting when there are alternative paths that may be taken for an action and the decision to perform the action isn't just based on a binary "go/no go" decision. In the live relocation example, the action the user wanted to perform was to move a guest application off of a host machine. However, there may have been a plurality of host machines that could accept the guest application. In that situation, systems management application 306 may have provided the user with a quick risk calculation with a set of alternatives to choose from, each with a different level of risk. Thus, the user wouldn't need to merely follow provided recommendations, but would be free to choose from alternatives with different levels of risk.

Moreover, illustrative embodiments may allow applications to individually register with systems management application 306 and/or with the risk broker system the risk levels associated with certain standard operations, such as software updates where the risk may be registered per package, network configuration changes, and deletions or modifications of files in particular directories by other applications. For example, a database instance may place a level red risk on updates of itself or component libraries. Also, the entity managing the database instance may implement an additional risk policy, such as all operations between 9 a.m. and 5 p.m. are a level red risk to reinforce that administrative operations should occur during off hours to reduce the likelihood of data corruption. Additionally, with a proper risk infrastructure in place, illustrative embodiments may utilize agents to automatically work on minimizing the level of risk when multiple alternatives are present in the requested operation.

Figure 4:
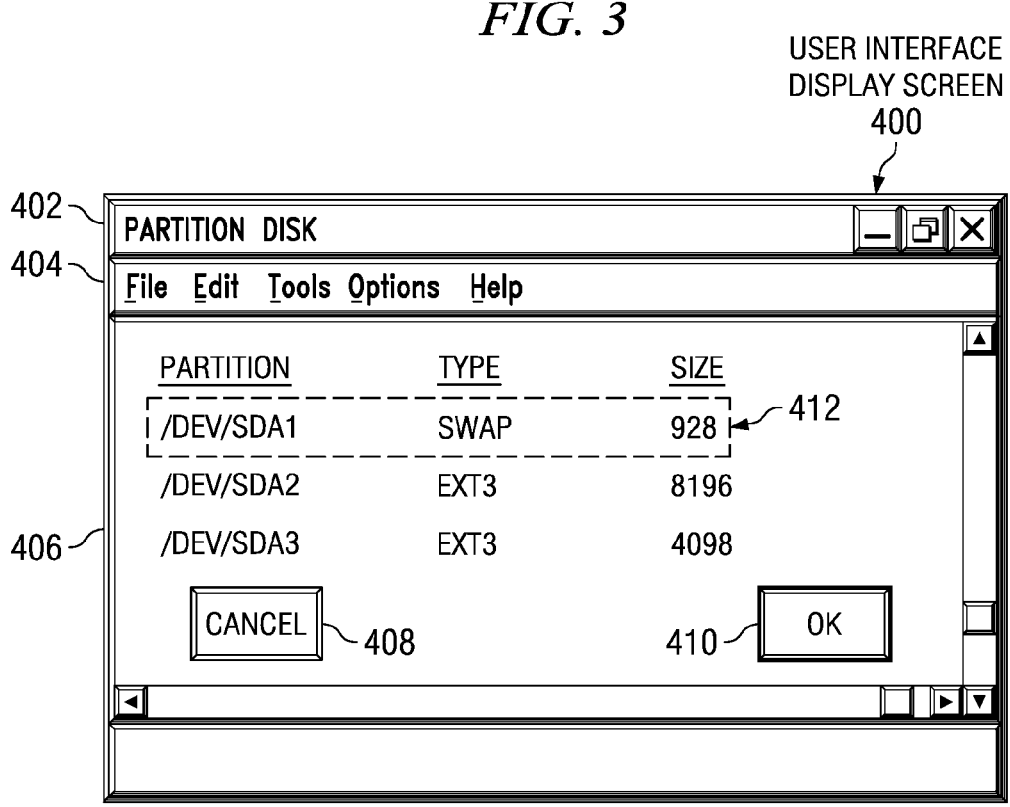
FIG. 4 is an exemplary illustration of a user interface display screen in accordance with an illustrative embodiment.

With reference now to FIG. 4, an exemplary illustration of a user interface display screen is depicted in accordance with an illustrative embodiment. User interface display screen 400 may, for example, be displayed in a display terminal, such as, for example, video display terminal 104 in FIG. 1. User interface display screen 400 is an interface that a user may utilize to interact with a systems management application, such as, for example, systems management application 306 in FIG. 3.

User interface display screen 400 includes title bar 402, menu bar 404, text area 406, cancel button 408, and OK button 410. Title bar 402 includes an operation title, a minimize button, maximize button, and a close button. In this example, the title of the operation to be performed is partition disk. Menu bar 404 includes menus for file, edit, tools, options, and help.

Text area 406 includes an area where a user may input commands to perform particular operations within a data processing system, such as, for example, data processing system 200 in FIG. 2. In this particular example, the user inputs commands to partition a hard disk, such as, for example, HDD 226 in FIG. 2, within the data processing system. However, the systems management application may display partition command 412 in a red color to indicate a level red risk to perform this action. The systems management application calculates the risk before performing the operation by using a set of composition rules, such as, for example, composition rules 312 in FIG. 3. Partition command 412 is a level red risk because, for example, the size of the swap partition is less than the size of random access memory (RAM).

In addition, text area 406 may include a background that may be rendered in real time in a plurality of different colors, such as in the five color risk scale used by illustrative embodiments to communicate a level of risk to the user. Further, the user may employ cancel button 408 to cancel commands input by the user in text area 406. Furthermore, the user may utilize OK button 410 to execute or perform commands input by the user in text area 406 despite any or all elevated visual warnings displayed in user interface display screen 400. Moreover, OK button 410 may also be rendered in real time in the five color risk scale.

Illustrative embodiments intentionally use the simple five color model because of its ability to easily map to user interfaces. The main focus of illustrative embodiments is to present advice to a novice or an intermediate user based on a prior analysis of risks in the data processing system.

For the color impaired, illustrative embodiments may utilize alternative risk representations, such as emoticons. Moreover, any risk other than a level green risk may, for example, invoke a second user interface display screen to appear to confirm the user's decision to perform an elevated risk operation despite the warnings. In addition, an explanation as to which components contribute to the overall risk may be presented in the second user interface display screen to provide the user with additional information to assist the user in making the decision to perform that particular action or not.

Using the live relocation example described above, the user interface may list check boxes for possible target machines, which may be color coded with respect to risk and/or sorted based on risk. Thus, illustrative embodiments provide an intuitive approach to specifying a target relocation machine for the virtual machine application.

Figure 5:
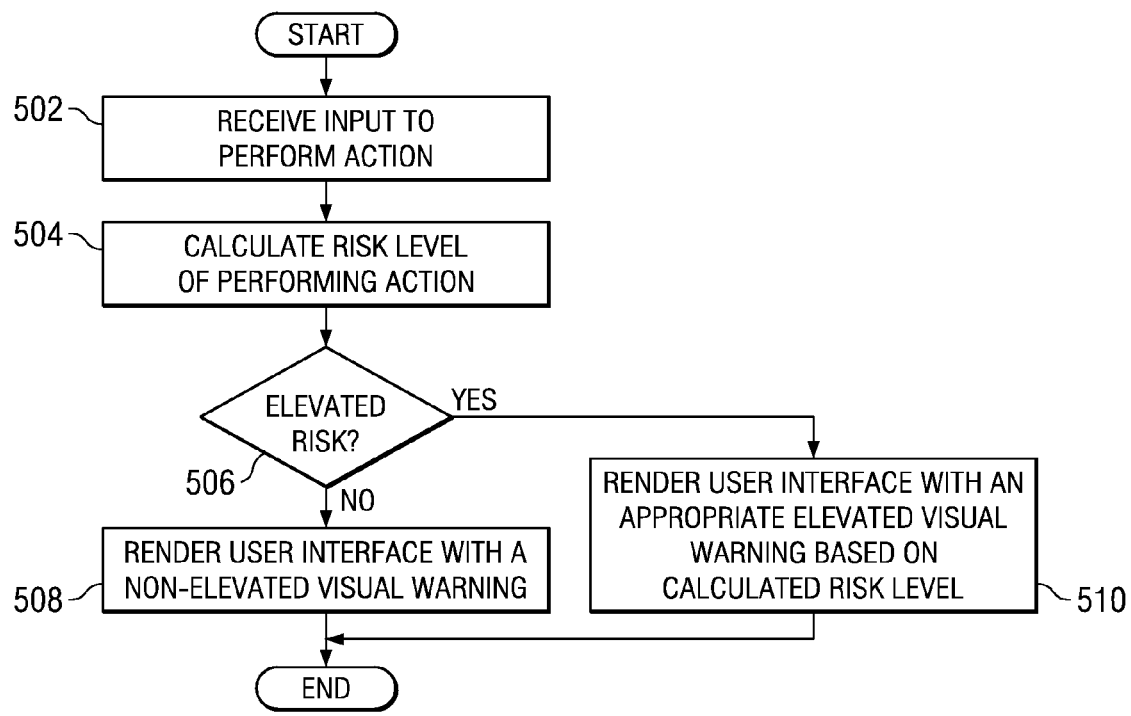
FIG. 5 is a flowchart illustrating an exemplary process for calculating and displaying a level of risk for performing an action within a data processing system in accordance with an illustrative embodiment.

With reference now to FIG. 5, a flowchart illustrating an exemplary process for calculating and displaying a level of risk for performing an action within a data processing system is shown in accordance with an illustrative embodiment. The process shown in FIG. 5 may be implemented in a systems management application, such as, for example, systems management application 306 in FIG. 3.

The process begins when the systems management application receives an input from a user, such as a system administrator, to perform an action, or operation, in a data processing system (step 502). Subsequent to receiving the user input to perform the action in step 502, the systems management application calculates a risk level of performing the action (step 504). After calculating the risk level in step 504, the systems management application makes a determination as to whether performing the action presents an elevated risk to the data processing system (step 506).

If performing the action does not present an elevated risk to the data processing system, no output of step 506, then the systems management application renders a user interface, such as, for example, user interface display screen 400 in FIG. 4, with a non-elevated visual warning (step 508). For example, the systems management application may render the user interface with an OK button, such as OK button 410 in FIG. 4, in the color green to represent no to very little risk in performing the action. Alternatively, the systems management application may render an entire background for a text area, such as, for example, text area 406 in FIG. 4, within the user interface in the color green. The process terminates thereafter.

If performing the action does present an elevated risk to the data processing system, yes output of step 506, then the systems management application renders the user interface with an appropriate elevated visual warning based on the calculated risk level (step 510). For example, the systems management application may render the user interface with the OK button or the text area background in the color red to represent a major risk to the data processing system in performing the action. The process terminates thereafter.

Thus, illustrative embodiments provide a computer implemented method, system, and computer usable program code for calculating a level of risk for a user to perform a particular action within the data processing system and displaying that calculated level of risk within a user interface in an easy to distinguish visual manner. The invention may take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer-readable medium may be any tangible apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a ROM, a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, et cetera) may be coupled to the system either directly or through intervening I/O controllers.

Network adapters also may be coupled to the system to enable the data processing system to become coupled to other data processing systems, remote printers, or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for calculating and rendering a risk level, the computer implemented method comprising:

responsive to receiving an input to perform an action within a data processing system, calculating a level of risk to the data processing system to perform the action based on a set of rules to form a calculated level of risk, wherein a rule in the set of rules escalates the calculated level of risk to a next higher risk level after receiving three or more of a same risk level for different components of the data processing system trying to perform the action within the data processing system;

determining if the calculated level of risk presents an elevated risk; and responsive to determining that the calculated level of risk does present the elevated risk, rendering a user interface with an appropriate elevated visual warning based on the calculated level of risk, wherein the appropriate elevated visual warning includes one of a plurality of specific colors each associated with a specific level of calculated risk rendered on an OK button maintained within the user interface changing a color of the OK button to the one of the plurality of specific colors based on the specific level of calculated risk.

2. The computer implemented method of claim 1, further comprising:

responsive to determining that the calculated level of risk does not present the elevated risk, rendering the user interface with a non-elevated visual warning.

3. The computer implemented method of claim 1, wherein the set of rules are a set of composition rules, and wherein the set of composition rules create a composite of aggregate risk produced by performing the action.

4. The computer implemented method of claim 3, wherein the set of composition rules include a basic rule that an overall risk of a particular action equals a highest level of all risks in the data processing system.

5. The computer implemented method of claim 3, wherein the calculating, determining, and rendering steps are preformed by a systems management application, and wherein the systems management application includes the set of composition rules.

6. The computer implemented method of claim 1, wherein the plurality of specific colors include green, yellow, orange, red, and black.

7. The computer implemented method of claim 1, wherein the specific level of calculated risk is one of a no to low risk level, a slight risk level, a significant risk level, a major risk level, and a catastrophic risk level.

8. The computer implemented method of claim 1, wherein the action within the data processing system includes a plurality of alternative paths, and wherein a different level of risk is calculated for each of the plurality of alternative paths for the action within the data processing system.

9. The computer implemented method of claim 8, wherein an agent is utilized to minimize the level of calculated risk for the plurality of alternative paths.

10. The computer implemented method of claim 1, wherein the one of the plurality of specific colors associated with the specific level of calculated risk is rendered in a color pattern within the user interface, and wherein the color pattern is one of a plaid pattern, a stripe pattern, or a polka dot pattern.

11. The computer implemented method of claim 7, wherein a color green in the user interface equals the no to low risk level, and wherein a color yellow in the user interface equals the slight risk level, and wherein a color orange in the user interface equals the significant risk level, and wherein a color red in the user interface equals the major risk level, and wherein a black color in the user interface equals the catastrophic risk level.

12. The computer implemented method of claim 1, wherein the one of the plurality of specific colors associated with the specific level of calculated risk is rendered on an entire background of a text area used for inputting commands within the user interface.

13. The computer implemented method of claim 1, wherein the appropriate elevated visual warning includes a specific emoticon for the specific level of calculated risk.

14. A data processing system for calculating and rendering a risk level, comprising:

a bus system;

a storage device connected to the bus system, wherein the storage device includes a set of instructions; and a processing unit connected to the bus system, wherein the processing unit executes the set of instructions to calculate a level of risk to a data processing system to perform an action based on a set of rules to form a calculated level of risk in response to receiving an input to perform the action within the data processing system, wherein a rule in the set of rules escalates the calculated level of risk to a next higher risk level after receiving three or more of a same risk level for different components of the data processing system trying to perform the action within the data processing system, determine if the calculated level of risk presents an elevated risk, and render a user interface with an appropriate elevated visual warning based on the calculated level of risk in response to determining that the calculated level of risk does present the elevated risk, wherein the appropriate elevated visual warning includes one of a plurality of specific colors each associated with a specific level of calculated risk rendered on an OK button maintained within the user interface changing a color of the OK button to the one of the plurality of specific colors based on the specific level of calculated risk.

15. The data processing system of claim 14, wherein the processing unit executes a further set of instructions to render the user interface with a non-elevated visual warning in response to determining that the calculated level of risk does not present the elevated risk.

16. A computer program product stored on a computer usable storage medium having computer usable program code embodied therein for calculating and rendering a risk level, the computer program product comprising:

computer usable program code configured to calculate a level of risk to a data processing system to perform an action based on a set of rules to form a calculated level of risk in response to receiving an input to perform the action within the data processing system, wherein a rule in the set of rules escalates the calculated level of risk to a next higher risk level after receiving three or more of a same risk level for different components of the data processing system trying to perform the action within the data processing system;

computer usable program code configured to determine if the calculated level of risk presents an elevated risk; and computer usable program code configured to render a user interface with an appropriate elevated visual warning based on the calculated level of risk in response to determining that the calculated level of risk does present the elevated risk, wherein the appropriate elevated visual warning includes one of a plurality of specific colors each associated with a specific level of calculated risk rendered on an OK button maintained within the user interface changing a color of the OK button to the one of the plurality of specific colors based on the specific level of calculated risk.

17. The computer program product of claim 16, further comprising:

computer usable program code configured to render the user interface with a non-elevated visual warning in response to determining that the calculated level of risk does not present the elevated risk.

18. The computer program product of claim 16, wherein the set of rules are a set of composition rules, and wherein the set of composition rules create a composite of aggregate risk produced by performing the action.

19. The computer program product of claim 18, wherein the set of composition rules include a basic rule that an overall risk of a particular action equals a highest level of all risks in the data processing system.

* * * * *